United States Patent
Rogala et al.

(10) Patent No.: US 6,575,484 B2
(45) Date of Patent: Jun. 10, 2003

(54) DUAL MODE REGENERATIVE SUSPENSION FOR AN OFF-ROAD VEHICLE

(75) Inventors: Jeffrey A. Rogala, Oconomowoc, WI (US); Eric N. Griesbach, North Prairie, WI (US)

(73) Assignee: Husco International, Inc., Waukesha, WI (US)

( * ) Notice: Subject to any disclaimer, the term of this patent is extended or adjusted under 35 U.S.C. 154(b) by 11 days.

(21) Appl. No.: 09/909,640

(22) Filed: Jul. 20, 2001

(65) Prior Publication Data

US 2003/0015846 A1 Jan. 23, 2003

(51) Int. Cl.[7] ............................................. B60G 9/04
(52) U.S. Cl. ................. 280/124.158; 280/124.159; 280/124.16; 280/124.161
(58) Field of Search ................. 280/5.514, 5.515, 280/124.158, 124.159, 124.161, 6.157, 6.159, 124.16; 188/266.2, 282.2, 282.6

(56) References Cited

U.S. PATENT DOCUMENTS

| | | | | |
|---|---|---|---|---|
| 3,871,635 A | * | 3/1975 | Unruh et al. | 267/187 |
| 4,295,538 A | * | 10/1981 | Lewus | 180/165 |
| 4,971,353 A | * | 11/1990 | Buma et al. | 280/5.514 |
| 5,087,072 A | * | 2/1992 | Kawarasaki | 280/5.503 |
| 5,149,131 A | * | 9/1992 | Sugasawa et al. | 280/5.512 |
| 5,160,161 A | * | 11/1992 | Tsukamoto et al. | 280/5.501 |
| 5,193,845 A | * | 3/1993 | Yokote et al. | 280/5.503 |
| 5,342,023 A | * | 8/1994 | Kuriki et al. | 267/64.16 |
| 6,394,238 B1 | * | 5/2002 | Rogala | 188/266.2 |
| 6,405,750 B1 | * | 6/2002 | Rogala | 137/493.8 |

* cited by examiner

*Primary Examiner*—Paul N. Dickson
*Assistant Examiner*—Toan C To
(74) *Attorney, Agent, or Firm*—George E. Haas; Quarles & Brady LLP

(57) ABSTRACT

A vehicle suspension has one or more hydraulic cylinders connecting an axle to a frame of the vehicle and each cylinder has a first and second chambers. The suspension operates in either a regeneration mode, in which a fluid path is provided between the first and second chambers, and a double acting mode, in which the first and second chambers are isolated from each other and fluid flows between each chamber and a separate accumulator. The selection between the regeneration and double acting modes is made in response to the pressure level in the cylinder as determined by a pressure sensor of a closed loop control system or by the pressure versus current characteristics of a electrically operated valve in the suspension for a loop control system. The hydraulic system also is able to raise and lower the suspension as necessary due to changes in the load carried by the vehicle.

20 Claims, 2 Drawing Sheets

DUAL MODE REGENERATIVE SUSPENSION FOR AN OFF-ROAD VEHICLE

BACKGROUND OF THE INVENTION

1. Field of the Invention

The present invention relates to suspension systems for off-road equipment, such as agricultural tractors, and more particularly to such suspension systems that provide hydraulic load leveling.

2. Description of the Related Art

Off-road equipment, such as the agricultural tractor 10 shown in FIG. 1, can carry widely varying loads. Often the load is an implement that is attached to a hitch 12 at the rear of the tractor. When a relatively heavy load is applied to the hitch 12, the rear of the tractor 10 is forced downward causing the tractor to pivot above the axle for the rear wheels 14. This raises the front wheels 16 which can adversely affect the maneuverability of the tractor. Similarly when a heavy load is applied to the front of the tractor, the front wheels are forced downward, which also affects steering and can affect traction of the rear wheels.

As a result, many vehicles have automatic load leveling systems which employ hydraulic cylinder between the axle and the frame of the vehicle which act as shock absorbers and which can be dynamically adjusted to maintain a proper spacing between the frame and the axle. When a heavy load is applied, the drop of the frame is sensed and additional hydraulic fluid is applied to the cylinder to raise the frame the desired distance from the axle. Thereafter, when the load is removed from the vehicle the frame will rise significantly above the axle. When this occurs hydraulic fluid is applied to the opposing chamber of the cylinder to lower the frame with respect to the axle. This type of automatic hydraulic load leveling system ensures that the frame and axle will be at the desired separation regardless of the size of the load applied to the vehicle.

One of the drawbacks of this load leveling system is that the opposite chambers of the double acting cylinder have separate pressure control circuits and require high pump pressure to move the cylinder in both directions. Thus the consumption of fluid from the pump for load leveling may adversely affect the availability of fluid pressure for other functions powered by the tractor. In order to compensate for that power consumption, the pump capacity would have to be increased thus raising the cost of the hydraulic system. Furthermore, these types of systems require relatively large accumulator volumes.

SUMMARY OF THE INVENTION

A suspension of a vehicle has a cylinder with a piston that defines a piston chamber and a rod chamber. The suspension is controlled by a hydraulic circuit that includes a first work port for connection to the rod chamber of the cylinder, and a second work port for connection to the piston chamber. A first control valve has an inlet to receive fluid from a pump on the vehicle and has an outlet coupled to the first work port. A proportional control valve selectively connects the first work port to the second work port. A pressure relief valve is connected between one of the first and second work ports and a tank return line of the vehicle, and opens in response to pressure in the respective work port exceeding a first threshold level. The first threshold level is varied by an electric signal. A first accumulator is coupled to the first work port and a second accumulator is connected to the second work port.

In the preferred embodiment, operation of the hydraulic circuit is controlled by an electronic controller that selectively operates the first control valve and the proportional control valve, and provides the electric signal to the valve pressure relief valve. The hydraulic circuit is operated in either a regeneration mode or a double acting mode depending upon pressure in the cylinder. Preferably, the regeneration mode is selected when pressure in the piston chamber exceeds a predefined level.

During normal operation of the suspension, the proportional control valve is maintained in an open state in the regeneration mode, and the proportional control valve is maintained in a closed state in the double acting mode.

That pressure is employed to determine whether to operate the suspension in a regeneration or a double acting mode. The control system making that determination is either a closed loop with pressure sensors or an open loop based on the pressure versus current characteristics of a solenoid valve in the hydraulic circuit.

The controller also operates the hydraulic circuit to raise and lower the suspension in order to compensate for changes in the load carried by the vehicle. In the regeneration mode, the suspension is lowered by adjusting the first threshold level to meter hydraulic fluid through the pressure relief valve to the tank return line, and is raised by opening the first control valve. In the double acting mode in which the rod chamber pressure is controlled, the suspension is lowered by opening the first control valve, and is raised by opening the first control valve and operating the proportional control valve to meter flow of hydraulic fluid. When the cylinder is inverted from that illustrated orientation and the rod chamber pressure is controlled in the double acting mode the operation is similar except that the first control valve is not opened to raise the vehicle.

DETAILED DESCRIPTION OF THE INVENTION

Figure 1:
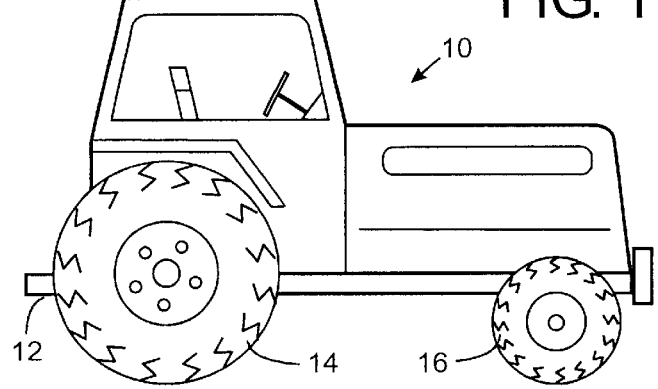
FIG. 1 is a side view of an off-road vehicle that incorporates a dual mode regenerative suspension system according to the present invention.
Figure 2:
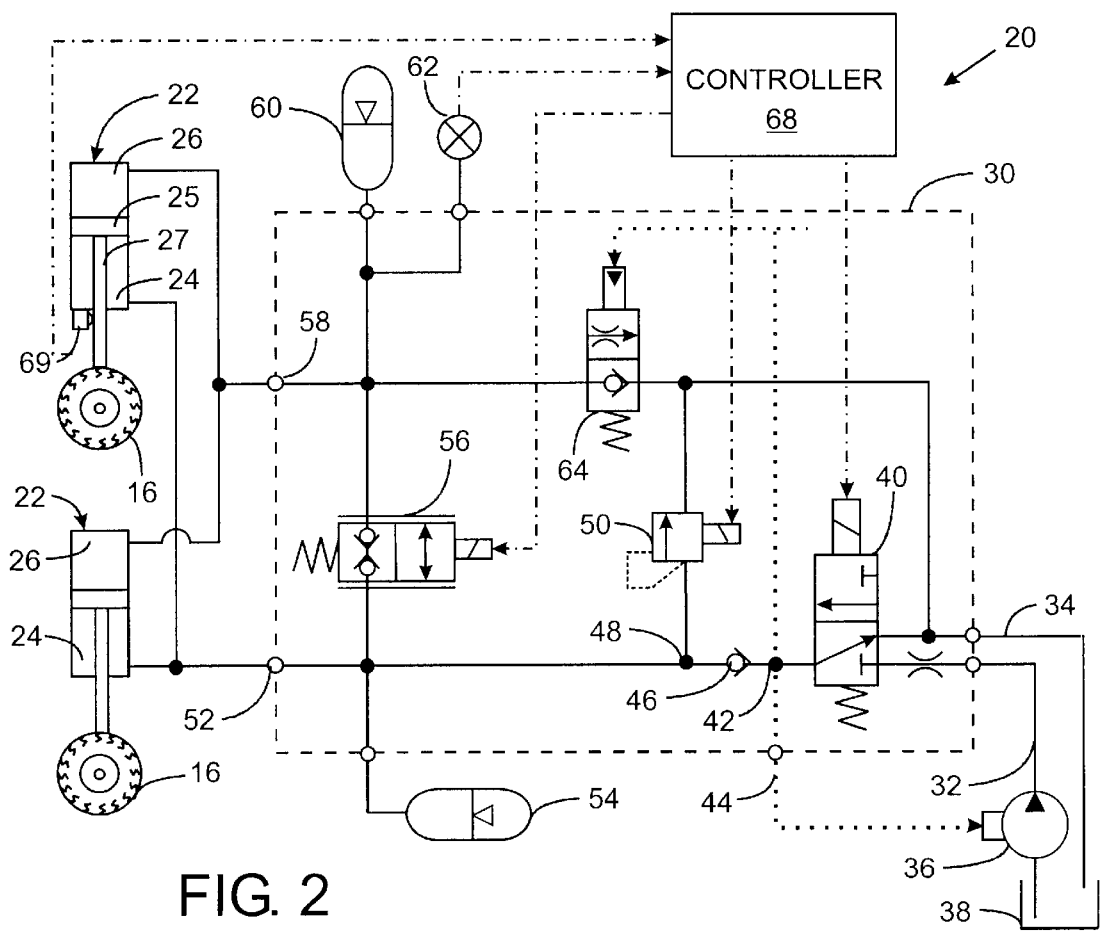
FIG. 2 is a schematic diagram of a hydraulic circuit of the dual mode regenerative suspension system.

With initial reference to FIG. 2, a hydraulic circuit 20 controls flow of fluid to and from a pair of cylinders 22 that are between the body of a vehicle, such as an agricultural tractor 10, and the wheels. The cylinders have internal bores in which a piston 25 is slidably received thereby forming a rod chamber 24 and a piston chamber 26 within the cylinder on opposite sides of the piston. The rod and piston chambers 24 and 26 vary in volume as the piston 25 moves within the cylinder. The cylinders 22 are attached to the frame of the tractor body 12 while the piston rod is attached by a rod 27 to the axle for the front wheels 16.

The hydraulic circuit 20 includes a valve assembly 30 that couples cylinder chambers 24 and 26 to a pump supply line 32 which receives hydraulic fluid under pressure from a variable displacement pump 36 that is driven by the engine on the tractor. The valve assembly 30 also conveys the fluid back to a tank 38 via a return line 34. The pump supply line 32 is connected in the valve assembly 30, to an inlet of a first control valve 40 that has a spool which is driven by a solenoid. Depending upon the position of that spool, an outlet 42 of the first control valve 40 is connected either to the pump supply line 32 or to the tank return line 34. The connection to the tank return line 34 occurs when the solenoid is de-energized.

The outlet 42 of the first control valve 40 is connected to the load sense line 44 (indicated by a dotted line) to provide a control signal to the variable displacement pump 36 on the tractor 10. A supply check valve 46 couples this outlet 42 to a node 48 in the valve assembly 30 and prevents the flow of hydraulic fluid from that first node back to the first control valve 40. The node 48 is coupled to the tank return line 34 by a pressure relief valve 50 which has a pressure threshold that is electrically variable, as will be described.

The first node 42 is connected to a first work port 52 that is coupled by external conduits to the rod chambers 24 of the two cylinders 22. The first work port 52 is connected to another port of the of the valve assembly to which a first gas charged accumulator 54 is connected. A solenoid proportional control valve 56 is connected between the first work port 52 and a second work port 58 to which the piston chambers 26 of the two cylinders 22 are connected. A second gas charged accumulator 60 and a pressure sensor 62 are connected to the second work port 58. A pilot operated control valve 64 connects the second work port 58 to the tank return line 34 in response to the pressure at the outlet 42 of the first control valve 40 exceeding a predefined second threshold level set by the valve bias spring.

The pressure sensor 62 provides an electric signal to a controller 68 that has outputs connected to the solenoids of the valves 40 and 56 and to the pressure threshold control input of relief valve 50. The controller 68 has a conventional hardware design that is based around a microcomputer having a memory in which the programs and data for execution by the microcomputer are stored. The microcomputer is connected input circuits and output circuits that interface the controller to the sensors and valves of the hydraulic circuit 20. The controller 68 also receives an input signal from a sensor 69 that provides an indication of the position of the wheels 16 relative to the frame of the tractor 10, such as by sensing an amount to which the rod 27 extends from one of the cylinders 22.

The present hydraulic circuit 20 provides two modes of operation, conventional double-acting suspension and a regeneration suspension mode. The determination of in which mode to operate is resolved based on whether the pressure in the suspension cylinders 22 is above or below a predefined threshold. The particular threshold pressure for a given suspension is dependent upon the design of that vehicle and factors such as the suspension mechanics and vehicle wheel base. The threshold pressure is established to provide adequate cylinder down-force (axle balanced) and optimal sizing of the accumulators 54 and 60.

Regeneration Suspension Mode

In the regeneration suspension mode, the first control valve 40 is normally in the off position, illustrated in FIG. 2, in which the valve's solenoid is de-energized. In this position any pressure at the outlet of the valve is relieved to tank via the tank return line 34, and check valve 46 prevents fluid from the remainder of the suspension system from flowing backwards through the first control valve 40. The pressure relief valve 50 is maintained electrically by the controller 68 at a high safety pressure setting (e.g. 220 bar) so that it will open only when an abnormally high pressure occurs in the cylinders 22. The controller 68 also opens the proportional control valve 56, thereby providing a path between the rod and piston chambers 24 and 26 of the cylinders 22 that allows a given amount of fluid flow to impart the desired degree of damping to the tractor suspension.

The cylinder is sized according to the weight of the tractor so that when the tractor 10 is stopped, the force of the fluid in the piston chambers 26 equals the force of fluid in the rod chamber 24 plus the force exerted by the rod 27. Thus the piston 25 normally is centered in the cylinder 22. As the tractor 10 rides over the rough terrain, the cylinder and rod combinations expand and retract to cushion the vibration. This action results in the fluid flowing through the proportional control valve 56 between the rod and piston chambers 24 and 26 and the vibration is damped by the flow restriction provided by the valve's orifice. Other conventional damping means for independent rebound and compression control are applicable. As the tractor 10 bounces, the fluid flows in both directions between the cylinder chambers 24 and 26 through the proportional control valve 56. When the terrain levels out, the pressure in the cylinder chambers reaches equilibrium which tends to center the piston 25 in the cylinder 22.

Changes in the mass of the load acting on either the front or rear of the tractor, causes the front of the tractor to lower or raise with respect to the front wheels 16. This force results in the rods 27 extending from or retracting into the cylinders 22 which moves the pistons 25 toward one cylinder end or the other. However, it is desirable for optimal shock absorption that the pistons be centered within each cylinder under smooth travel conditions. To counter this drift in piston position, the controller 68 monitors the signal from position sensor 69 to detect how far the wheels are separated from the frame of the tractor 10 and determine whether the suspension needs to be raised or lowered in response to the load changes. Specifically, the suspension position signal provided by sensor 69 is read periodically by the controller 68 and a rolling average of those readings is calculated over a given period of time, for example six seconds, to produce an average position. The average position is analyzed to determine whether the suspension has drifted far enough from the center position to warrant adjustment. The averaging prevents temporary movement of the pistons, due to rough terrain, from triggering suspension adjustment. The suspension is adjusted when the average position is more than an a predefined distance on either side of the center point of the cylinder.

In order to raise the suspension in the regeneration suspension mode by extending the piston rod 25 from the cylinder 22, the controller 68 energizes the solenoid for the first control valve 40, so that fluid from the pump supply line 32 flows to node 48. At the same time, the controller energizes the proportional control valve 56 to open a passage between node 48 and the second work port 58. While this is occurring, the pressure relief valve 50 is maintained at the high safety relief pressure. This configuration of the valves applies equal pressure to both chambers 24 and 26 of the cylinders 22. However, the greater surface area of the piston 25 in the piston chamber 26 causes the pressurized fluid to exert more force on the piston than is exerted by the fluid in the rod chamber 24. This additional force extends the rod farther from the cylinders 22 thereby raising the suspension.

One may observe that the relatively high pressure at the outlet 42 of the first control valve 40 is communicated to the pilot operated control valve 64 which causes that latter valve to open. However, the relatively small orifice provided by the pilot operated control valve 64 results in only a small parasitic fluid loss to tank return line 34 during this raise operation.

At other times, when it is necessary to lower the suspension in the regeneration mode, the first control valve 40 is maintained in a de-energized state in which the outlet 42 is connected to the tank return line 34. Thus the outlet is a the low tank pressure and the supply check valve 46 and the pilot operated control valve 64 will be closed. The controller 68 also activates the proportional control valve 56 to the fully open position and adjusts the setting of the pressure relief valve 50 to meter fluid flow to the tank return line 34.

In this valve configuration, the weight of the tractor 10 exerted on the cylinders 22 forces fluid out of the piston chambers 26 through the proportional control valve 56 and pressure relief valve 50 to the tank return line 34 and the tank 38. The controller 64 selectively controls the pressure relief valve 50 to meter this flow so that the tractor drops at a specified rate. Pressure feedback control is optional to provide rate control. Some of the fluid at node 48 flows into the rod chambers to fill their expanding volume. During the suspension lowering, the controller 68 monitors the signal from the position sensor 69, and closes valve 50 when the pistons 25 are centered within the cylinders 22.

Double Acting Suspension Mode

The regeneration mode normally is preferred over a conventional double acting suspension. However, when the load at the front of the tractor 10 is relatively small, external dynamic and reaction forces can offset the spring mass of the vehicle. As a consequence, the suspension may not lower causing the front end of the vehicle to remain in a high position. During this condition, a prolonged lowering command exists and a sudden large force, such as due to rapid breaking or an implement height adjustment, can result in the suspension cylinders 22 "crashing down". As a consequence, a conventional double acting suspension is preferable to the regeneration mode under this conditions for certain vehicle applications.

In the double acting suspension mode when the suspension is not being adjusted, i.e. raised or lowered, the first control valve 40 and the proportional control 56 are maintained closed so that disturbances on the suspension force fluid into and out of the respective accumulators 54 and 60. The pressure relief valve 50 is maintained at the relatively high pressure setting (e.g. 220 bar). For example, when a bump in the ground forces the front wheels 16 toward the tractor frame, thereby compressing the suspension, fluid is forced from the piston chambers 26 into the second accumulator 60 and the expanding rod chambers 24 draw fluid from the first accumulator 54. Similarly, when the front wheels encounter a depression and move away from the frame of the tractor, fluid in the second accumulator 60 is fed into the piston chambers 26, and the fluid in the rod chambers 24 is forced into the first accumulator 54. The precharge pressure the accumulators 54 and 60 sets the spring rate of the suspension.

As the load on the tractor changes in the double acting suspension mode, it too may become necessary to raise or lower the suspension in order to maintain the pistons substantially centered within each cylinder 22. In order to raise the suspension in this mode, the controller 68 opens the first control valve 40 and the pressure relief valve 50 is set at a pressure level which corresponds to a rod control pressure, e.g. 50 bar, which as will be described is the pressure at which a transition occurs between the regeneration and double acting modes. This action applies fluid from the pump supply line 32 to node 48 and establishes the rod control pressure at that node. Then the valve controller 68 opens the proportional control valve 56 to meter the flow across the piston 25 to extend the rod 27 and center the piston. The greater piston area in the piston chamber 26 than in the rod chamber 24 causes the cylinder-piston assembly to extend, raising the suspension. As noted previously, the loss of fluid through the now open pilot operated control valve 64 is minimal due to the relatively small orifice of that valve.

In order to lower the suspension in the double acting mode, the controller 68 opens the first control valve 40 after adjusting the pressure relief valve 50 to the rod control pressure level. The proportional control valve 56 is maintained in the closed state, thus applying the fluid from the pump supply line 32 to only the rod chambers 24 causing the rod 27 to retract into each cylinder 22, thus lowering the suspension. The pressure at the outlet of the first control valve 40 causes the pilot operated control valve 64 to open and vent fluid from the piston chambers 26 into the tank return line 34. During the lowering operation, the controller 68 monitors the signal from position sensor 69 and when that signal indicates that the pistons 25 are centered, the valve are closed to terminate the suspension lowering.

Mode Selection

Whether to use the conventional double acting mode or the regeneration mode is determined based on the pressure within the cylinders 22 which is a function of the magnitude of the load acting on the suspension. To make that determination, the controller 68 periodically reads the pressure within the piston chambers 26, as indicated by the signal from pressure sensor 62 as shown in the closed-loop control system of FIG. 2. If this pressure is above a predefined threshold, e.g. 50 bar, the suspension system will be operated in the regeneration mode, and otherwise in the double acting mode.

Figure 3:
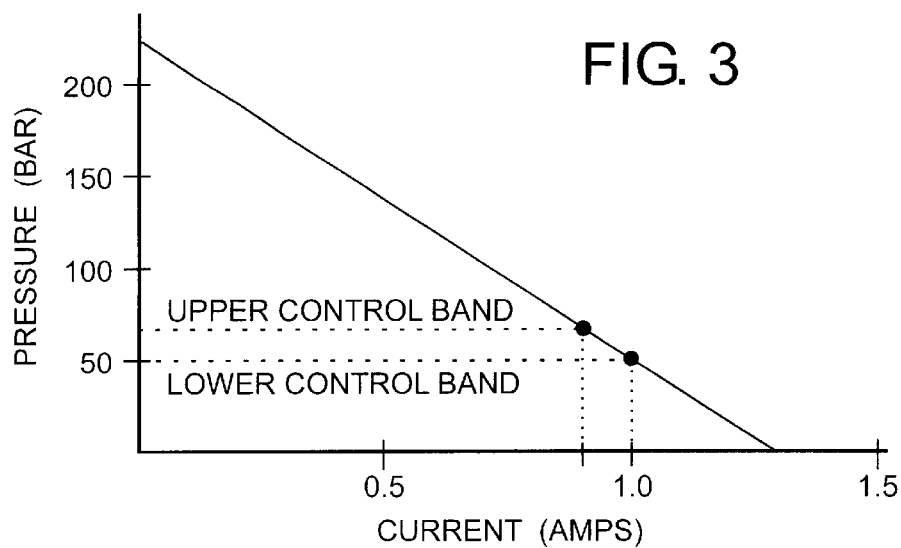
FIG. 3 is a graph depicting a typical relationship between the pressure in the cylinders and the current required to operated a proportional relief valve in the hydraulic circuit.

The use of a pressure sensor 62 to determine the mode of operation, provides a closed-loop control system in that the sensor provides feedback to the controller 68 as to the pressure within the cylinders 22. However, this closed loop system requires the use of a pressure sensor, thus adding to the cost of the system. Although this may be acceptable in many applications of the present invention, an alternative embodiment eliminates the need for the pressure sensor 62 by providing an open-loop control process. In that process, a pressure versus current characteristic of the proportional pressure relief valve 50 is used to dictate the suspension mode. This approach takes advantage of the characteristic that the desired switching pressure setting, e.g. 50 bar, of the proportional relief valve 50 corresponds to a specific current (e.g. 1.0 amps) of the control signal, as shown in FIG. 3.

If the controller 68 determines from position sensor signal that the suspension needs to be lowered, while in the regeneration mode, the controller will apply a ramped current to the solenoid of the pressure relief valve 50 in which the current starts at initially low value and begins increasing. The remainder of the raise operation is a described previously for the regeneration mode. As the current increases, the controller 68 continuously monitors the signal from the position sensor 69 to detect movement of the cylinder-piston arrangement. If the movement begins before the current rises to the mode change threshold (1.0 amps) the hydraulic system remains in the regeneration mode. However, once the current exceeds the that threshold, the lowering operation converts to the double acting mode. The lowering continues in the double acting mode until the controller 68 detects that the cylinder is properly positioned, at which time the lowering terminates.

A transition also can occur from double acting to the regeneration mode when the suspension is being raised. In this case, the first control valve 40 is energized to convey pressurized fluid from the supply line 32 the node 48 and the proportional control valve 56 meters the fluid flow into the piston chambers 26. If the controller 68 fully opens the proportional control valve 56 without observing any upward movement of the cylinders 22, as indicated by the position sensor signal, the controller 68 concludes that raising is not possible with the pressure relief valve 50 set at the relatively low rod control pressure. Thus, a transition must be made to the regeneration mode, in which the proportional control valve 56 is maintained fully open, but the pressure relief valve 50 is set at the much higher safety pressure setting (e.g. 220 bar). This higher pressure relief valve setting applied fluid at a significantly higher pressure to the piston chambers 26 than was permitted in the double acting mode.

Figure 4:
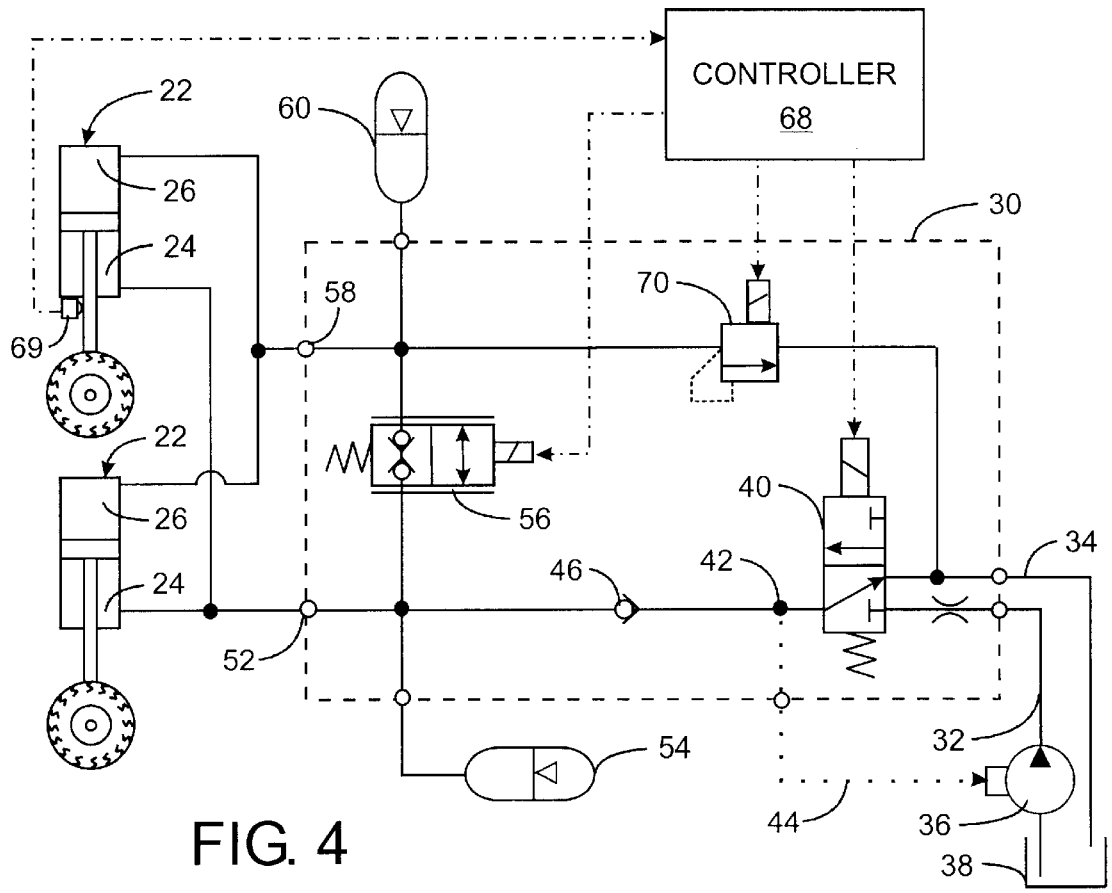
FIG. 4 a schematic diagram of another embodiment of the controlled piston chamber, dual mode regenerative suspension system.

The circuit in FIG. 2, relies upon the pressure in the rod chamber 24 being controlled to a desired pressure value. Alternatively, a circuit, such as shown in FIG. 4, can be employed which controls the pressure in the piston chambers 26 to a predefined value. This embodiment of the invention has the advantage over the version in FIG. 2, in that the pilot operated control valve 64 has been eliminated. Also, the volume of the accumulators can be reduced further with this type of system, which results in a cost savings. The pressure relief valve 70 in this embodiment couples the second work port 58 for the piston chambers 26 to the tank return line 34. The remaining components of the second embodiment which correspond to similar components of the first embodiment in FIG. 2 have been assigned identical reference numerals.

The function of this embodiment is similar to that described in detail with respect to FIG. 2. In summary, to raise the suspension in the regeneration mode, the first control valve 40 and the proportional control valve 56 are both energized to provide passages that apply pressurized fluid from the pump supply line 32 to both work ports 52 and 58. The suspension will rise because of the size differential between the rod and piston chambers 24 and 26. While that is occurring, the pressure relief valve 70 is maintained at the high pressure safety setting, e.g. 220 bar. To lower the suspension in the regen mode, the first control valve 40 remains de-energized, while the proportional control valve 56 is energized. The controller 68 selectively activates the pressure relief valve 70 to meter fluid from the cylinders 22 to the tank return line 34, enabling the cylinders to lower. During both the raise and lower operations, the controller 68 monitors the position of the piston via the signal from position sensor 69 to determine when to terminate the operations by closing the respective valves.

Similarly, the suspension is raised in the double acting mode by metering the proportional control valve 56, while setting the pressure relief valve 70 to the piston control pressure level. This piston control pressure level may be the same as or different than the pressure used in the version in FIG. 2, in which the rod control pressure was employed. In the raised state, the pressure differential between the two cylinder areas causes the pressure in the piston chambers 26 to apply greater force to the piston than that which is applied due to pressure in the rod chamber 24. As a consequence, the rod is extended from the cylinder. To lower the piston in the double acting mode, the first control valve 40 is opened to apply fluid from the pump to the rod chambers 24, while the proportional control valve 56 is de-energized into the closed state. As the pressure builds within the rod chambers 24 and the piston moves compressing the piston chambers 26, fluid is forced from the forced from those latter chambers through the opening of the pressure relief valve 70, which has been set to a predetermined piston control pressure.

Switching between the regeneration and double acting modes in the embodiment of FIG. 4, also occurs based on the amount of current applied to the solenoid of the pressure relief valve 70, in much the same way as described previously with respect to the application of current to the pressure relief valve 50 in FIG. 2. That is, as long as the movement of the pistons can occur in the regeneration mode without having to increase the current to the pressure relief valve 70 above the threshold level (e.g. 1.0 amp), operation will remain in the regeneration mode. However, should that current threshold be exceeded, the operation switches to the double acting mode. Similarly, if the controller 68 opens the proportional control valve 56 to the full position in the double acting mode without being able to raise the suspension, the operation transitions to the regeneration mode. Alternatively a pressure sensor can be provided to implement a closed loop control strategy as described previously with respect to the embodiment of FIG. 2.

What is claimed is:

1. A hydraulic circuit for controlling a suspension of a vehicle having a cylinder with a piston that defines a first chamber and a second chamber within the cylinder, said hydraulic circuit comprising:

a first work port for connection to the second chamber of the cylinder;

a second work port for connection to the first chamber of the cylinder;

a first node connected to the first chamber;

a first control valve with an inlet for connection to a pump supply line of the vehicle and a port coupled to the first node;

a pressure relief valve which selectively connects one of the first work port and the second work port to a tank return line of the vehicle in response to pressure in the one of the first work port and the second work port exceeding a first threshold level which is varied by an electric signal;

a proportional control valve selectively connecting the first work port to the second work port;

a first accumulator coupled to the first work port; and a second accumulator coupled to the second work port.

2. The hydraulic circuit as recited in claim 1 further comprising a check valve coupling the port of the first control valve to the first node, wherein fluid can flow through the first check valve only in a direction from the port to the first node.

3. The hydraulic circuit as recited in claim 1 wherein the pressure relief valve selectively connects the first work port to the tank return line; and further comprising a second control valve connecting the second work port to the tank return line.

4. The hydraulic circuit as recited in claim 3 wherein the second control valve is a pilot operated valve that responds to pressure at the port of the first control valve exceeding a second threshold level by providing a fluid path between the second work port and the tank return line.

5. The hydraulic circuit as recited in claim 1 wherein the pressure relief valve selectively connects the second work port to the tank return line.

6. The hydraulic circuit as recited in claim 1 further comprising an electronic controller that selectively operates the first control and the proportional control valve, and provides the electric signal to the valve pressure relief valve.

7. The hydraulic circuit as recited in claim 6 further comprising a sensor connected to the controller and detecting pressure at one of the first work port and the second work port.

8. The hydraulic circuit as recited in claim 6 wherein the controller operates in either a regeneration mode or a double acting mode in response to pressure in the cylinder, in the regeneration mode the proportional control valve is maintained in an open state, and in the double acting mode the proportional control valve is maintained in a closed state, except when adjusting the suspension system.

9. The hydraulic circuit as recited in claim 8 wherein in the regeneration mode is selected in response to pressure in the cylinder exceeding a predefined level.

10. The hydraulic circuit as recited in claim 8 wherein in the regeneration mode is selected in response to an electric current applied to the pressure relief valve being less than a predefined level.

11. The hydraulic circuit as recited in claim 8 wherein in the regeneration mode, the controller lowers the suspension by adjusting the first threshold level to meter hydraulic fluid through the pressure relief valve, and raises the suspension by opening the first control valve.

12. The hydraulic circuit as recited in claim 8 wherein in the double acting mode, the controller lowers the suspension by opening the first control valve, and raises the suspension by opening the first control valve and operating the proportional control valve to meter flow of hydraulic fluid.

13. The hydraulic circuit as recited in claim 8 wherein in the double acting mode, the controller lowers the suspension by opening the first control valve, and raises the suspension by operating the proportional control valve to meter flow of hydraulic fluid.

14. The hydraulic circuit as recited in claim 8 wherein the controller has a mode of operation in which pressure in the piston chamber is held constant while pressure in the rod chamber is increased.

15. The hydraulic circuit as recited in claim 1 further comprising:
   a sensor which produces a signal indicting pressure at one of the first work port and the second chamber; and
   a controller connected to the sensor and producing the electric signal.

16. A method for controlling a suspension of a vehicle having a cylinder with a piston that defines a first chamber and a second chamber within the cylinder, the vehicle including a valve assembly which couples the cylinder to both a pump and a tank, said method comprising:
determining pressure in the second chamber;
operating in a regeneration mode in response to pressure in the second chamber exceeding a predefined level, in the regeneration mode the valve assembly provides a fluid passage between the first chamber and the a second chamber; and
operating in a double acting mode in response to pressure in the second chamber being less than the predefined level, in the double acting mode the valve assembly isolates the first chamber from the a second chamber, and fluid flows to and from the first chamber and a first accumulator, and fluid flows to and from the second chamber and a second accumulator.

17. The method as recited in claim 16 further comprising:
raising the suspension in the regeneration mode by operating the valve assembly to connect the pump to the second chamber; and
lowering the suspension in the regeneration mode by operating the valve assembly to meter hydraulic fluid from the second chamber to the tank.

18. The method as recited in claim 16 further comprising:
lowering the suspension in the double acting mode by operating the valve assembly to connect the pump to the first chamber and not to the second chamber; and
raising the suspension in the double acting mode by operating the valve assembly to connect the pump to the first chamber and metering hydraulic fluid from the pump to the second chamber.

19. The method as recited in claim 16 further comprising determining whether the pressure in the first chamber exceeds the predefined level in response to a level of electric current applied to the valve assembly.

20. The method as recited in claim 16 wherein the valve assembly includes a pressure relief valve which selectively connects one of the first chamber and the second chamber to the tank return in response to pressure in the one of the first chamber and the second chamber exceeding a pressure threshold which is defined by an electric signal; and said method further comprising producing the electrical signal to define a relatively high first pressure threshold so that the pressure relief valve opens only under abnormal pressure conditions; and producing the electrical signal to define a relatively lower second pressure threshold so that the pressure relief valve opens to adjust the suspension in response to varying load forces acting on the vehicle.

* * * * *